Patented Oct. 12, 1954

2,691,569

UNITED STATES PATENT OFFICE 2,691,569

PRODUCTION OF CHLORINE AND METAL NITRATES

Ralph Miller, Pleasantville, N. Y., assignor to The Chemical Foundation, Incorporated, a New York corporation No Drawing. Application February 5, 1952, Serial No. 270,107

8 Claims. (Cl. 23—102)

This invention is concerned with the production of chlorine and metal nitrates from nitric acid and the corresponding chloride.

The process of reacting nitric acid and an alkali metal chloride to form chlorine, nitrosyl chloride and the nitrate followed by the treatment of the nitrosyl chloride to recover chlorine and nitric acid therefrom has been subjected to intensive study and development. This work has resulted in the commercial production of chlorine and sodium nitrate from sodium chloride and nitric acid by one producer after suitable solutions were found to the many problems which arose in attempting to carry out the process on a commercial scale.

When a chloride, such as sodium chloride, is reacted with relatively concentrated nitric acid the principal overall reaction may be written as:

(1) $3NaCl + 4HNO_3 = 3NaNO_3 + Cl_2 + 2H_2O + NOCl$

Other reactions also take place, such as the formation of hydrogen chloride and lower oxides of nitrogen These reactions cause losses in yield and difficulties in making the final product adequately pure. Hence, the formation of these substances must be minimized and provision must be made to remove them from the chlorine.

It can be seen from reaction (1) that one third of the chloride and one fourth of the nitric acid are present as nitrosyl chloride. Since nitrosyl chloride is a gaseous substance it leaves the reaction zone along with the chlorine. The fundamental problem in the process is the substantially complete recovery of the oxides of nitrogen in the nitrosyl chloride as nitric acid and the recovery of the chloride as chlorine. Many elaborate methods have been devised to secure this result. These methods are known to those familiar with the art and their complexities and difficulties appreciated.

It is an object of this invention to react alkali metal chlorides with nitric acid to form the corresponding nitrate and chlorine without forming an appreciable amount of hydrogen chloride and forming at most a fraction of the stoichiometric amount of nitrosyl chloride.

A second object of this invention is the production in the absence of non-condensible gases of chlorine and an alkali metal nitrate from an alkali metal chloride and nitric acid.

A further object of this invention is the use of oxygen in the air as the fundamental oxidizing agent in converting the chloride to chlorine using an oxygen carrier as a cyclic reagent.

A further object of this invention is a continuous process for the production of chlorine and an alkali metal nitrate from alkali metal chloride and nitric acid in which each of the necessary separation steps is capable of being carried out with ease and in substantially conventional equipment.

The above objectives and others which may be gleaned from what follows are attained by using manganese dioxide as the oxygen carrier.

Briefly, the invention consists of reacting the alkali metal chloride such as sodium or potassium chloride with nitric acid or a suitable concentration and at least the stoichiometric amount of manganese dioxide. The chlorine formation recation may be summarized as:

$2NaCl + MNO_2 + 4HNO_3 = 2NaNO_3 + Mn(NO_3)_2 + Cl_2 + 2H_2O$

The reaction is preferably carried out at an elevated temperature so that gaseous chlorine is formed and some water is evaporated. The residual solution is composed primarily of a solution of sodium nitrate and manganous nitrate. The solution of manganous nitrate and sodium nitrate is then evaporated and thermally decomposed in the presence of air to convert the manganous nitrate to manganese dioxide and nitric acid without materially affecting the sodium nitrate. The sodium nitrate is separated from the manganese dioxide by leaching. The manganese dioxide and nitric acid are recycled to the chlorine formation step of the process and solid sodium nitrate is recovered from the aqueous solution.

Any chloride may be converted to the corresponding nitrate and chlorine by the process of this invention providing it is thermally decomposed at temperatures in excess of the temperature at which manganous nitrate is thermally decomposed in the presence of air to form nitric acid and manganese dioxide.

The steps in the process can now be described in greater detail using sodium chloride as an example, although potassium or barium or calcium chlorides and similar chlorides could be used for illustrative purposes.

Since the products of the process consist of chlorine and a nitrate, usually a solid nitrate rather than a solution, any water introduced into the chlorine formation reaction zone will have to be eliminated. This is accomplished by evaporation. While the water can be removed in this fashion it is an item of expense. For this reason it is preferred to use a solid chloride and as concentrated nitric acid as is available in the chlorine formation step of the process. Half of the nitric acid charged to the chlorine formation reaction zone is recycle acid, which can be produced at a concentration of 50% without difficulty and at a somewhat higher concentration if desirable by known means to be described. Normally, commercial nitric acid has a concentration of about 50%. If nitric acid of this concentration is available it can be seen that the evaporation load of the process is moderate.

A preferred form of reactor is an acid-proof brick lined reaction tower suitably equipped with heating coils or the equivalent and inlets and outlets suitably located through which the reactants can be added to the system and the products withdrawn. Two of the reactants are solids, the sodium chloride and the manganese dioxide. The other reagent is nitric acid. The addition of solid reactants to a reaction zone without the simultaneous introduction of air can be accomplished by forming a slurry of the solids and a solution of the nitrates which is a product of the reaction. It is preferable to have the manganese dioxide used in excess and to charge the manganese dioxide to the tower close to the top. The chloride is charged to the tower a short distance below the manganese dioxide inlet and the nitric acid below that. The gaseous products of the reaction leave the tower through the top outlet. This method of adding the reagents is preferred to minimize the amount of other substances which might leave the tower at the top along with the chlorine and the water. The mixture of materials within the tower will cause some hydrogen chloride to form as well as some nitrosyl chloride and lower oxides of nitrogen. At the temperature prevailing within the tower these substances will tend to vaporize and escape with the chlorine. As they move towards the top of the tower they will contact the slurry of manganese dioxide. The manganese dioxide reacts with each of these materials in such a fashion that they do not contaminate the evolved chlorine. If the manganese dioxide-containing zone is sufficiently extended, none of these substances will leave the tower along with the chlorine.

To have the reaction proceed at a vigorous rate it is preferable to keep the temperature at the top of the tower above 100° C. and the temperature at the base of the reaction tower at an even higher temperature.

One of the advantages of the process is that conditions can be controlled to secure a very high yield of products based on the reactants consumed. An excess of manganese dioxide and nitric acid compared with the chloride can be employed in the reaction zone without decreasing the yield since the excess is automatically recovered in the following step of the process.

Although the exact mechanism of the reaction is not known, the process produces chlorine and a nitrate solution continuously by the continuous addition of the reactants to a reaction zone and the continuous withdrawal of the products of the reaction. As all of the possible contaminants of the chlorine react with manganese dioxide, it is possible to insure the purity of the chlorine by having it contact a large surface area of manganese dioxide. The contaminants will form a solution of either manganous nitrate or manganous chloride or both. This additional contacting is preferably done in a vessel separate from the reaction vessel so that its temperature can be controlled without regard to the temperature of the reactor in which the chlorine is being formed. It is preferred to keep it just above 100° C. so that only a small amount of the water that accompanies the chorine can condense upon it. The condensate is returned to the chlorine formation reaction zone as reflux, thereby recovering and returning the values contained in the contaminants.

The purified stream of water vapor and chlorine is cooled to condense most of the water. The cool, partially dried chlorine may then be dehydrated by any suitable means such as sulfuric acid. The cool dry chlorine may then be compressed and liquefied.

The nitrate solution formed in the tower leaves the tower through a bottom outlet. If an excess of manganese dioxide has been used it will leave the tower dispersed in the nitrate solution. If an excess of nitric acid has been added to the reaction zone it will leave the tower in the nitrate solution if the temperature at the top of the tower is too low to permit it to escape as a gas.

The concentration of the nitrate solution flowing from the reaction tower will depend upon the concentration of the nitric acid charged to the tower and the temperature conditions under which the reaction is carried out. This latter condition determines the amount of water which leaves the reactor with the chlorine. If the solution can be further concentrated without any decomposition of the manganous nitrate then it is preferable to evaporate some of the water in the solution prior to the thermal decomposition of the manganous nitrate.

In order to selectively thermally decompose the manganous nitrate to form manganese dioxide and nitric acid, certain essential conditions must be met since the simple decomposition of manganous nitrate produces manganese dioxide and nitrogen dioxide. One condition is that the thermal decomposition be carried out in the presence of air and water vapor and with the temperature as low as possible consistent with securing a rapid rate of decomposition. In addition, the residence period in the elevated temperature region of the nitric acid formed in the reaction must be brief so that the nitric acid is not decomposed.

One method that has been described of carrying out the thermal decomposition consists of placing an acid resisting, internally heated, rotating drum in a housing connected with a nitric acid recovery system. The drum is heated to about 200° C. and a small vacuum is pulled at the end of the nitric acid recovery system so that sufficient air is present to form nitric acid rather than nitrogen dioxide. A thin film of the solution is put on the rotating drum by having it rotate in a pool of the nitrate solution maintained at such a level that the lower surface of the drum is immersed. The speed of the drum is regulated so that the manganous nitrate is completely decomposed before the surface of the drum reenters the nitrate solution. A knife edge is so placed that it scrapes off the solid adhering to the drum surface just before the drum surface reenters the nitrate solution. It is also possible to apply the nitrate solution to the drum by letting it trickle on to it from overhead supply nozzles. The reaction that takes place during the thermal decomposition of the hydrated manganous nitrate may be written:

$$2MN(NO_3)_2 \cdot H_2O + O_2(air) = 2MNC_2 + 4HNO_3$$

The solid manganese dioxide and sodium nitrate remain on the drum and are removed by the knife edge. The nitric acid and the

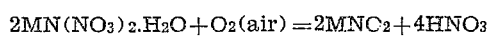

excess water in the solution vaporize and flow to the nitric acid recovery system. Since it is desirable to recycle nitric acid as concentrated as possible, the nitric acid recovery system is preferably a fractionating column equipped with suitable auxiliaries such as a condenser, reflux controls, etc., so that substantially constant boiling nitric acid is removed from the base of the fractionating column and nitric acid free water is obtained at the top of the column.

Another method of carrying out the thermal decomposition is to establish a dense phase fluidized bed of manganese dioxide and sodium nitrate. Hot air is passed into the bed and the hot solution sprayed into the fluidized bed is maintained between about 200 and 250° C. by heating it either indirectly with high pressure steam, hot oil or Dwotherm or any other appropriate heat transfer fluid or by direct contact with products of combustion in a second vessel. If the latter method is employed, the mixture of manganese dioxide and sodium nitrate is conveyed from the decomposition vessel to the heating vessel. The mixture of solids is maintained as a dense phase fluidized bed by hot products of combustion. The temperature to which the mixture is heated is just below the melting point of the nitrate salt. The heated mixture is then returned to the decomposition vessel. The circulation of the mixture of solids is so controlled that any gas leakage between the decomposition vessel and the heating vessel is in the direction of the decomposition vessel so that nitric acid is not lost along with the products of combustion.

To insure against the loss of nitrogen values due to the accidental formation of oxides of nitrogen rather than nitric acid, the effluent gases leaving the nitric acid recovery system are washed with a slurry of manganese dioxide. Any oxides of nitrogen formed may then be recovered as a solution of manganous nitrate.

The mixture of solids formed in the thermal decomposition operation is composed primarily of manganese dioxide and sodium nitrate. The simplest method of separating the sodium nitrate from the manganese dioxide is to leach the mixture with a hot unsaturated solution of sodium nitrate. The sodium nitrate dissolves to form a saturated solution at the temperature at which contacting takes place and the manganese dioxide is unaffected. The solution is separated from the insoluble dioxide. The saturated solution is cooled preferably in a vacuum crystallizer to form solid sodium nitrate. The solid sodium nitrate is separated from the solution and dried. The separated solution is reheated and returned to the leaching step.

The manganese dioxide separated from the saturated sodium nitrate solution is washed with hot make-up water, and dewatered preferably in a continuous centrifuge. The washed manganese dioxide is recycled to the chlorine formation step of the process.

Other methods of leaching the sodium nitrate from the manganese dioxide can be used, such as the simple leaching with water in a countercurrent system. The sodium nitrate is then recovered by simple evaporation or sprayed into a prilling tower to produce solid particles whose form makes them especially suitable for application to the soil in fertilizer mixes or alone.

Other methods of carrying out the separation can also be employed, including melting the sodium nitrate and filtering off or settling the manganese dioxide, flotation in a saturated nitrate solution and the like. Any method which is economical and separates the manganese dioxide from the sodium nitrate can be used. It is not essential that the manganese dioxide be free from sodium nitrate since the manganese dioxide is recycled to the process. Any sodium nitrate adhering to it will not be lost. It will merely be recycled.

While the above example described the production of chlorine and sodium nitrate from sodium chloride and nitric acid, other chlorides can also be employed, providing the nitrate formed decomposes above the temperature range at which manganous nitrate decomposes. Special advantages accure when potassium chloride is the metal chloride, since the final products are chlorine and potassium nitrate. Potassium nitrate is recognized as being an especially useful fertilizer. Its plant value is obvious since it contains two of the three most widely used plant nutrients. Secondly, potassium nitrate is much less hygroscopic that other fertilizer nitrates and hence simplifies the conditioning of mixed fertilizers. Although these facts have been known for many years, no commercially feasible process for producing agricultural grade potassium nitrate has been devised to date although much work has been carried out on the problem. The chloride in potassium chloride has no plant value under ordinary circumstances and for some crops it is definitely deleterious. This is true, for example, in the case of tobacco. Hence, the removal of the chloride has a real value in addition to the advantage of producing chlorine as a co-product of the process.

The process as described above requires the recycling of all the manganese dioxide. If a low grade manganese ore is employed in the chlorine formation step of the process rather than recycled manganese dioxide, then in addition to chlorine and a nitrate, metallurgical grade manganese dioxide can also be recovered. The process is varied in minor ways depending upon the impurities in the ore.

The impurities in the ore may be put into one of three classes:

1. Those substances which are insoluble in the reaction mixture such as silica and similar refractory minerals.

2. Those substances in the ore which form nitrates which decompose at temperatures below the temperature range at which manganous nitrate decomposes. Such substances are iron and aluminum.

3. Those substances in the ore which form nitrates that decompose at temperatures above the range at which manganous nitrate decomposes.

In general it is preferred to employ low grade ores with a minimum of substances that fall into class 3 since they appear in the final nitrate product and while they have a definite fertilizer value, the nitrate with which they are combined in the final product has not contributed to the production of chlorine.

Those substances which are insoluble in the reaction mixture can be removed from the effluent nitrate solution by filtration. Hence, their presence requires a relatively simple additional step but no reagents are consumed because of their presence. The substances which fall into class 2 may be handled in one of two ways depending upon local conditions. In the simplest case, the chlorine formation is run at a temperature so high that the class 2 substances present are decomposed during the reaction and as a result they form insoluble substances similar to the substances that fall into class 1. A suitable temperature to achieve this result is about 135° C. If it is desirable to carry out the chlorine formation reaction at a temperature at which the class 2 substances are stable, then the effluent solution is concentrated prior to the thermal decomposition step. The concentration of the effluent nitrate solution is carried out at a temperature sufficiently high to thermally decompose the nitrates of the class 2 substances. The class 2 substances come out of solution as insoluble oxides. They are separated from the mixed nitrate solution in any convenient way. The separated nitrate solution is then thermally decomposed to form nitric acid and manganese dioxide without affecting the metallic nitrate of the metallic chloride initially used. The metallic nitrate is separated from the manganese dioxide by leaching. The concentrated manganese dioxide is of metallurgical grade and becomes a principal product of the process. When a manganese containing ore is employed as described above the manganese dioxide is not recycled but the nitric acid formed in the thermal decomposition is.

It can be seen that under favorable conditions when metallurgical grade manganese dioxide is a product of the process, a product is formed for each of the three principal steps of the process which are:

1. The chlorine formation reaction.
2. The decomposition of the hydrated manganous nitrate in the presence of air.
3. The separation of the metallic nitrate from the manganese dioxide.

It may be noted from the foregoing that when a metallurgical grade concentrate of manganese dioxide is a product of the process, and the source of the manganese dioxide is a low grade manganese dioxide containing ore then those impurities in the ore which fall into class 3 will contaminate the nitrate formed from the metal chloride charged to the process. In some instances this is undesirable. In other instances the nitrates formed from the impurities in the ore may tend to decompose in the temperature range at which it is preferred to decompose the manganous nitrate. This same limitation is present when it is preferred to carry out the thermal decomposition of the manganous nitrate under such conditions that the yield of metal nitrate formed from the metal chloride charged to the process is adversely affected. To overcome these potential shortcomings the process is modified by forming chlorine in two reaction zones rather than in one. For example, when reacting potassium chloride with nitric acid to form potassium nitrate and chlorine the process may be modified as follows:

Into an acid resistant lined, reaction tower equipped with heating coils a slurry made up of solid potassium chloride and a concentrated solution of potassium nitrate is pumped. The slurry may be preheated to take some of the heating load off the heating coils used to heat the contents of the reaction tower. Nitric acid of a concentration in the neighborhood of 50% is also pumped into the tower. A temperature gradient is preferably maintained in the tower. The top temperature is maintained in excess of 100° C. and the bottom temperature five or preferably more degrees higher.

The molar ratio of potassium chloride to nitric acid in the feed should not be higher than .75 to 1 and may be lower. In the reaction tower the principal overall reaction which takes place may be written:

$$3KCl + 4HNO_3 = 3KNO_3 + 2H_2O + Cl + NOCl$$

In addition some hydrogen chloride and lower oxides of nitrogen tend to fall. Under the conditions described the solution flowing from the bottom of the reactor is substantially a potassium nitrate solution which may contain some free nitric acid. The recovery of the potassium nitrate is described below. All of the other substances mentioned leave the tower at the top outlet. It is preferable, although not essential, to keep the hydrogen chloride content of the effluent gases to a minimum since this permits the effluent gases to be cooled to condense out a part of the water vapor contained in the gas stream flowing from the reactor.

The mixed gases are then contacted with a slurry of manganese dioxide. The chlorine and water vapor contained in the gas stream are unaffected by the manganese dioxide but the other gases all react with the manganese dioxide to form a solution made up of manganous nitrate and manganous chloride. The resultant solution may then be withdrawn into a second reaction tower where it is treated at an elevated temperature with a mixture of manganese dioxide and nitric acid. The manganous chloride reacts with the $MnO_2$ and the nitric acid to form chlorine and manganous nitrate. The principal reaction that takes place in the slurry contacting operation may be written:

$$2NOCl + 2MnO_2 = MnCl_2 + Mn(NO_3)_2$$

The reaction between the manganous chloride, manganese dioxide and nitric acid may be written:

$$MnCl_2 + MnO_2 + 4HNO_3 = 2Mn(NO_3) + 2H_2O + Cl_2$$

The solution flowing from the base of the second reaction tower is composed substantially of a manganous nitrate solution. The gaseous products from the second reaction tower may be drawn through the same slurry washer in which the manganous chloride was initially formed to remove any gases other than chlorine and water vapor that may be present.

The manganous nitrate solution that flows from the second reaction tower, may be concentrated if necessary. The manganous nitrate contained in the concentrated solution is then thermally decomposed in the presence of air and water vapor to form nitric acid and manganese dioxide. The manganese dioxide is recycled. Part is returned to the slurry washing step and part is returned to the second reaction tower. The nitric acid formed as a result of the thermal decomposition of the manganous nitrate is recycled to either the first or second reaction towers. This method of carrying out the process affords the advantage of simplifying the thermal decomposition of the manganous nitrate since the metal nitrate formed from the metal chloride charged to the process is not mixed with the manganous nitrate. However, it does require two reaction zones in which chlorine is formed.

It is also possible to combine the slurry washing step with the second chlorine reaction zone. Rather than washing the gases from the first reaction zone with just a slurry of manganese dioxide, the gases are contacted with a hot slurry of manganese dioxide and nitric acid preferably in a reaction tower. The chlorine formed in the first reaction zone is unaffected. All of the other gases react with the slurry to form manganous nitrate and/or chlorine. Chlorine mixed with some water vapor leaves the second reaction zone as a gas. A manganous nitrate solution possibly containing some free nitric acid is the other product formed in the second reaction zone. The manganous nitrate so formed is then thermally decomposed in the presence of air and water vapor to form manganese dioxide and nitric acid both of which are recycled.

The potassium nitrate contained in the effluent solution from the first reaction zone may be concentrated if desired and then cooled to cause solid potassium nitrate to form. The solid nitrate is separated from the mother liquor. The separated mother liquor is mixed with solid potassium chloride and the resultant slurry pumped into the first reaction tower.

This modification is especially useful when in addition to chlorine and a metal nitrate a manganese dioxide concentrate is made from a low grade manganese dioxide containing ore. The metal chloride and nitric acid are reacted together in a first reaction tower to form a solution of the metal nitrate and a gaseous mixture of chlorine, nitrosyl chloride, oxides of nitrogen hydrogen chloride and water vapor. The effluent gases are then contacted with a slurry of the manganese dioxide containing ore. The resultant slurry with its manganese dioxide content adjusted is then treated in a second reactor with nitric acid to form chlorine and a solution composed principally of manganeous nitrate. The non-gaseous product formed in the second reactor is then treated in the described manner to recover nitric acid and a manganese dioxide concentrate. In this way any impurities contained in the low grade manganese dioxide containing ore do not contaminate the metal nitrate formed from the metal chloride.

If preferred, the slurry washing step and second chlorine formation reactor may be combined by contacting the effluent gases from the first chlorine formation reaction zone with a slurry of the low grade manganese dioxide containing ore and nitric acid to form a gas stream containing chlorine and no other gaseous contaminate difficult to remove. As described, the non-gaseous product of the second reaction zone is treated by the aforesaid steps to form a manganese dioxide concentrate and nitric acid. The nitric acid is recycled and the manganese dioxide concentrate is a third product of the process.

I claim:

1. The process of producing chlorine and a metal nitrate which comprises reacting a metal chloride with nitric acid in a first reaction zone at a temperature sufficiently elevated to form a solution containing the corresponding metal nitrate and a gas stream containing principally chlorine and nitrosyl chloride, recovering the metal nitrate from the metal nitrate-containing solution, withdrawing the gas stream from the reaction zone and contacting such withdrawn gas stream with a slurry of manganese dioxide to form a solution containing manganous nitrate and manganous chloride, separating the chlorine from the manganous salt solution; passing the manganous salt solution to a second reaction zone and reacting it therein with manganese dioxide and nitric acid to form chlorine and a manganous nitrate solution; separating the chlorine from the manganous nitrate solution and thermally decomposing the manganous nitrate solution in the presence of air to form manganese dioxide and nitric acid.

2. A process in accordance with claim 1 in which the manganese dioxide formed in the thermal decomposition step is recycled to the second chlorine formation step.

3. A process in accordance with claim 1 in which the metal chloride is sodium chloride.

4. A process in accordance with claim 1 in which the metal chloride is potassium chloride.

5. A process of producing chlorine and a metal nitrate which comprises reacting a metal chloride with nitric acid in a first reaction zone at a temperature sufficiently elevated to form a solution containing the corresponding metal nitrate and a gas stream containing principally chlorine and nitrosyl chloride, recovering the metal nitrate from the metal nitrate solution, withdrawing the gas stream from the reaction zone and contacting such withdrawn stream in a second reaction zone with nitric acid and manganese dioxide to form a manganous nitrate solution and an additional amount of chlorine, separating the chlorine formed in the first and second reaction zones from the manganous nitrate solution; and thermally decomposing the manganous nitrate solution in the presence of air to form manganese dioxide and nitric acid.

6. A process according to claim 5 in which the manganese dioxide formed in the thermal decomposition step is recycled to the second reaction zone.

7. A process of producing chlorine, a metal nitrate and a manganese dioxide concentrate from a metal chloride, nitric acid and a low grade manganese dioxide-containing ore which comprises reacting a metal chloride and nitric acid in a first reaction zone at a temperature sufficiently elevated to form a solution containing the corresponding metal nitrate and a gas stream containing principally chlorine and nitrosyl chloride, recovering the metal nitrate from the metal nitrate-containing solution, withdrawing the gas stream from the reaction zone, passing the withdrawn gas stream into a second reaction zone and contacting it therein with a slurry of nitric acid and the said low grade ore, to form an additional quantity of gaseous chlorine and a manganous nitrate-containing solution, separating the chlorine formed in the first and second reaction zones from the manganous nitrate-containing solution, freeing the manganous nitrate-containing solution from undissolved associated impurities; thermally decomposing the manganous nitrate solution in the presence of air to form a manganese dioxide-containing solid and nitric acid, separating the nitric acid from such solid, and washing the separated solid with an aqueous solution to form a manganese dioxide concentrate substantially free from nitrates.

8. A process in accordance with claim 7 in which the metal chloride is potassium chloride.

No references cited.